United States Patent
Long

(10) Patent No.: US 6,939,216 B2
(45) Date of Patent: Sep. 6, 2005

(54) SYSTEM AND METHOD FOR PROCESSING MEAT

(76) Inventor: David H. Long, 4880 Old Springfield Rd., Springfield, OH (US) 45502

( * ) Notice: Subject to any disclaimer, the term of this patent is extended or adjusted under 35 U.S.C. 154(b) by 0 days.

(21) Appl. No.: 10/230,930

(22) Filed: Aug. 29, 2002

(65) Prior Publication Data

US 2004/0040513 A1 Mar. 4, 2004

(51) Int. Cl.⁷ .............................................. A22B 3/00
(52) U.S. Cl. ........................................................ 452/52
(58) Field of Search ................ 452/52, 198; 119/14.02, 119/14.01, 14.03

(56) References Cited

U.S. PATENT DOCUMENTS

| | | | | |
|---|---|---|---|---|
| 3,715,973 A | * | 2/1973 | Sukup ........................ 99/331 |
| 4,288,856 A | * | 9/1981 | Linseth ...................... 119/841 |
| 4,673,576 A | * | 6/1987 | D'Aiello, Jr. .................. 426/2 |
| 4,820,527 A | * | 4/1989 | Christensen et al. .......... 426/2 |
| 5,061,497 A | * | 10/1991 | Thacker et al. ............... 426/31 |
| 5,185,174 A | * | 2/1993 | Sawhill ...................... 426/583 |
| 5,372,811 A | * | 12/1994 | Yoder ....................... 424/94.6 |
| 5,575,999 A | * | 11/1996 | Yoder ....................... 424/94.6 |
| 5,824,355 A | * | 10/1998 | Heitritter et al. ........... 426/459 |
| 6,342,839 B1 | * | 1/2002 | Curkendall et al. ...... 340/573.3 |
| 6,365,152 B1 | * | 4/2002 | McKinney ................. 424/93.4 |
| 6,383,544 B1 | * | 5/2002 | Elkins ....................... 426/511 |
| 6,440,485 B1 | * | 8/2002 | Cheuk et al. ............... 426/646 |
| 6,506,401 B1 | * | 1/2003 | Rothamel et al. ........... 424/439 |
| 6,506,402 B1 | * | 1/2003 | Winstrom ................... 424/442 |
| 6,506,423 B2 | * | 1/2003 | Drouillard et al. ............ 426/2 |
| 6,516,746 B2 | * | 2/2003 | Pratt ....................... 119/51.02 |
| 6,579,236 B2 | * | 6/2003 | Pratt ......................... 600/437 |
| 6,586,028 B1 | * | 7/2003 | Brown ....................... 426/231 |
| 6,664,897 B2 | * | 12/2003 | Pape et al. ............... 340/573.3 |
| 6,681,717 B2 | * | 1/2004 | Burghardi et al. ....... 119/51.02 |
| 6,701,869 B2 | * | 3/2004 | Fuqua ........................ 119/174 |
| 6,726,941 B2 | * | 4/2004 | Ethington et al. ............. 426/2 |
| 6,777,017 B2 | * | 8/2004 | Porter et al. ................ 426/590 |

* cited by examiner

Primary Examiner—Thomas Price
(74) Attorney, Agent, or Firm—Jacox, Meckstroth & Jenkins

(57) ABSTRACT

A system and method is shown for processing animals, such as calves, from birth to slaughter by utilizing hot-fed rations during the feeding process. The system and method reduces or eliminates the need to use hormones and simultaneously reduces or eliminates the need to sterilize the meat products. Each calf or animal is weaned at a weaning station, fed at a feeding station, slaughtered at a slaughter station to provide a carcass that is substantially the same size as other carcasses for the same breed of animal processed in the system. The consistent carcass size enables manufacture of consistent carcasses which, in turn, facilitates providing substantially the same size meat cuts. This feature enables use of a standard-size packaging, such as a case-ready package, which may be shipped for display and purchase at a store.

8 Claims, 2 Drawing Sheets

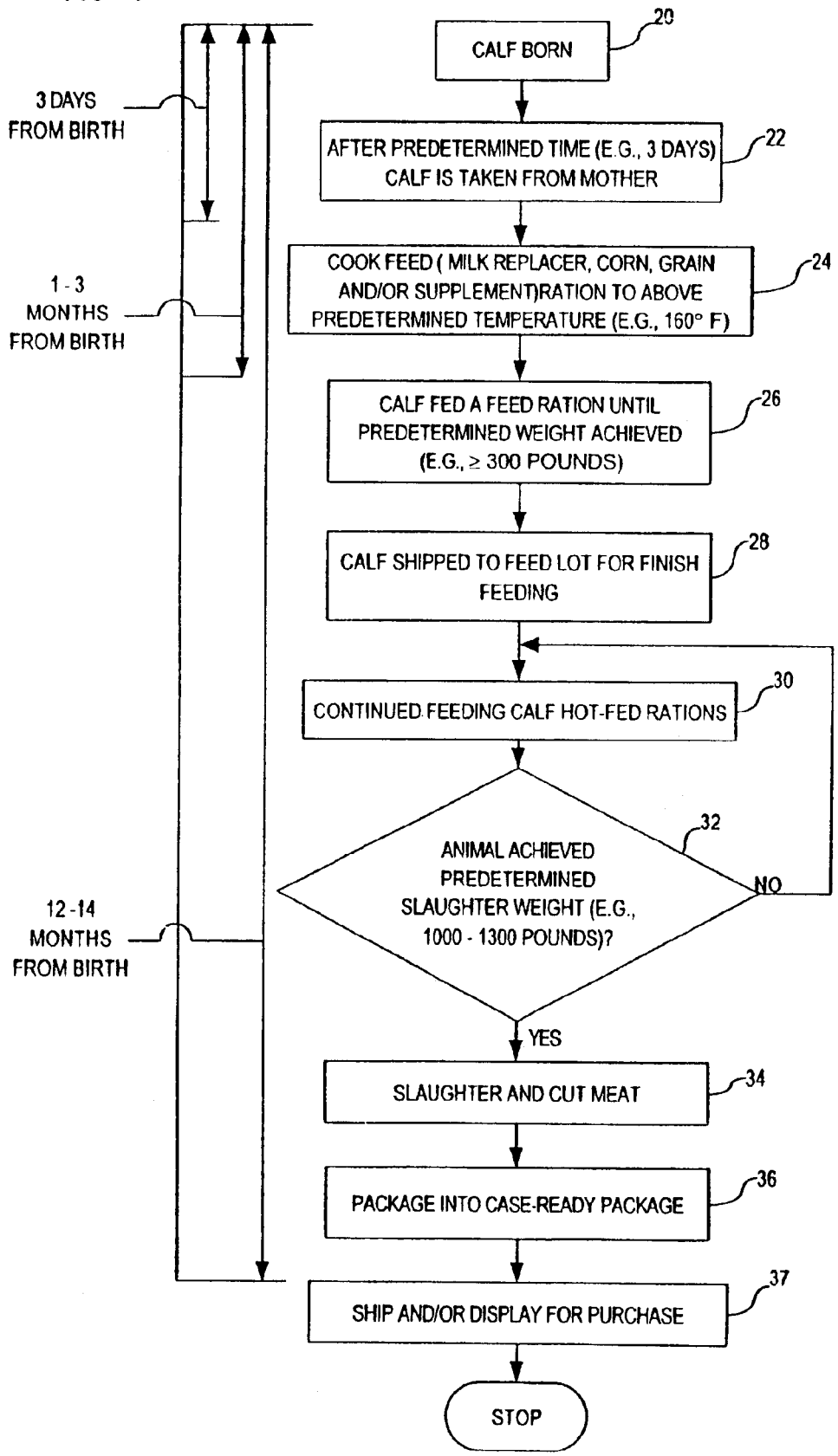

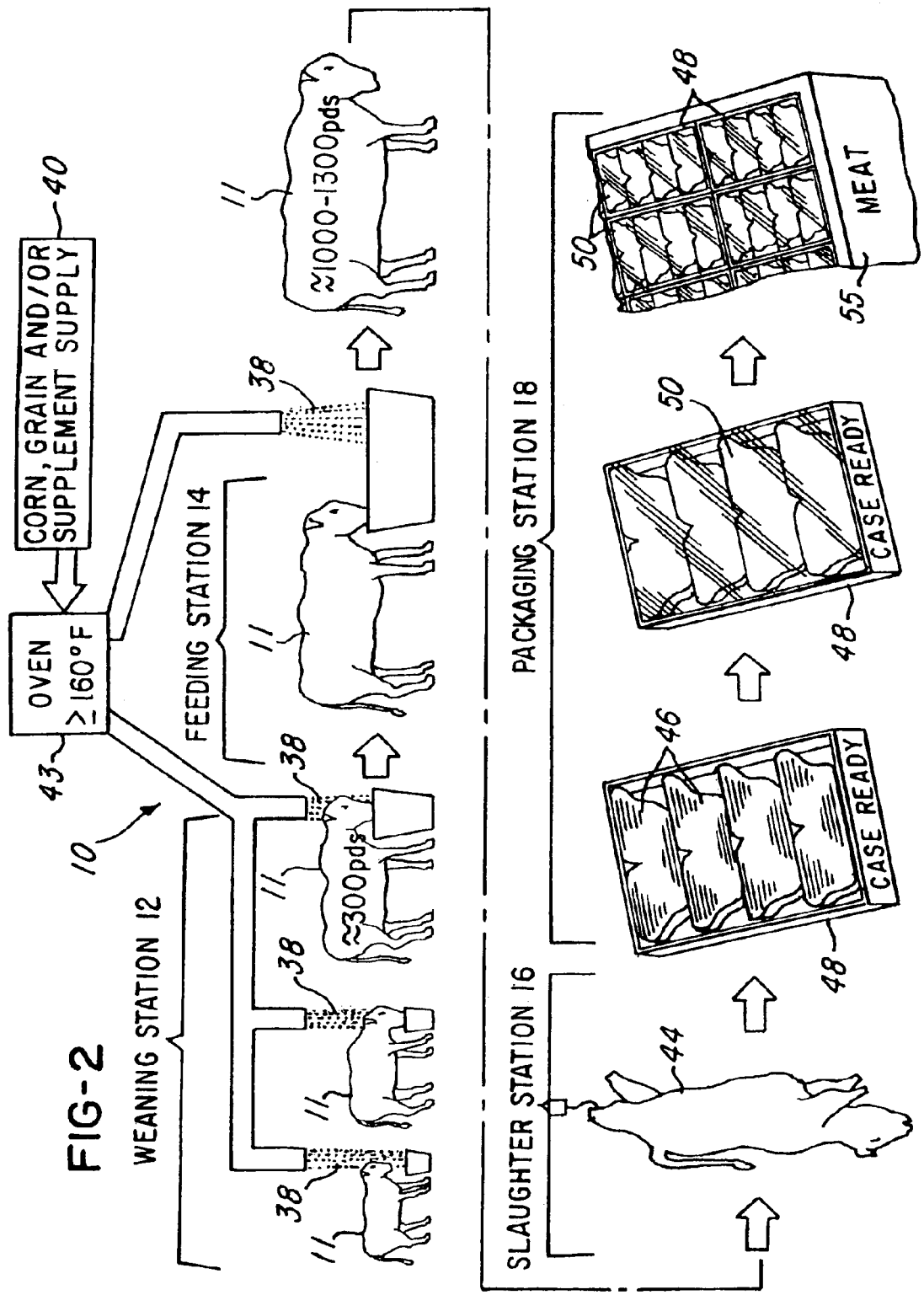

SYSTEM AND METHOD FOR PROCESSING MEAT

BACKGROUND OF THE INVENTION

A. Field of the Invention

This invention relates to a feeding process and, more particularly, to a system and method for improving the feeding of cattle to provide improved meat quality, processing times, and use of standardized case-ready packaging.

B. Description of the Related Art

Traditional cattle feeding processing primarily utilized grass grazing sometimes in combination with corn, grain, hay, supplement and various bi-products, such as brewers grain, oat hull, wheat mids or any combination of such feed products. The cattle were born and left with their mothers to graze on grass until they reached approximately 500–700 pounds. They were then transferred to a finish feed lot and fattened to a slaughter weight of between 1100–1500 pounds, depending upon the cattle type. At the feed lot or before leaving the grass, the cattle were typically implanted with hormones to, for example, accelerate the growth process. The cattle were implanted three or four times prior to slaughter.

The muscle tissue of grass-fed animals is generally courser and undesirable to eat because the meat from the carcasses of such animals is tougher and considered by some people to be "stringy." In contrast, animals fed on grain at a feed lot were generally more desirable to eat, although the hormones and some grass-fed toughness in the meat remained. Thus, while the hormones accelerated the animal's growth, it negatively affected the animal's meat texture.

Another problem with this traditional cattle feeding process is that it took approximately 18–24 months to get a calf from birth to slaughter.

Another problem with the cattle feeding processes of the past is that the feed oftentimes had undesirable bacteria, such as salmonella and other toxins. During the slaughter process, the organs of the animal sometimes became punctured, which resulted in the salmonella or toxins getting onto the meat that was ultimately butchered and consumed by a consumer. In order to kill these germs and sanitize the meat, packers used a sterilizing spray liquid which was sprayed directly onto the meat. The spray liquid may be undesirable because it adversely affected the taste of the meat and also added to the cost of the overall process.

Still another problem with the systems and methods of the past is that a typical animal was picked to go to slaughter from the degree of fat in the animal and number of days that the animal was on a grain ration. In the past, this typically ranged from 120–200 days, depending on the rations fed to the animal, whether the animal was being grazed on grass and the like. Consequently, the animals were often different sizes at the time they were slaughtered. Because the carcasses were of different sizes, it was difficult to provide any standard packaging in which the meat from the carcasses could be placed because the meat cuts were different sizes.

What is needed, therefore, is a system and method for reducing the birth-to-slaughter time period, while improving the meat quality, the time required to raise the animals from birth to slaughter, and the use of standardized packaging.

SUMMARY OF THE INVENTION

One object of the invention is to provide a system and method for processing animals which may improve the quality of meat, the birth-to-slaughter time period, provide consistent size meat cuts for enabling use of case-ready packaging and reduces or eliminates problems with bacteria and use of hormones in the process.

In one aspect, this invention comprises a method for feeding cattle, comprising the steps of weaning a calf from its mother after a predetermined time and feeding the calf feed rations that have been cooked above a predetermined temperature.

In another aspect, this invention comprises a method for feeding cattle, comprising the steps of weaning a calf from its mother after a predetermined number of days, feeding the calf feed rations that have been cooked above 160 degrees Fahrenheit, slaughtering the calf when it reaches a predetermined weight, cutting meat from each of the calves substantially the same size for packaging in case-ready packages, packaging the cut meat in substantially identical case-ready packages and repeating the method for a plurality of calves.

In still another aspect, this invention comprises a process for improving meat quality and increasing meat-from-feed conversion for cattle comprising the steps of weaning each of the cattle from its mother after a predetermined time, feeding each of the cattle cooked feed after the predetermined time, and slaughtering each of the cattle when it achieves a predetermined weight.

In yet another aspect this invention comprises a system for improving meat quality comprising a weaning station for weaning a calf from its mother after a predetermined period, a cooking station for cooking feed above a predetermined temperature to provide cooked feed, a feeding station for feed the cooked feed to the calf, and a slaughter station for slaughtering the calf when it reaches a slaughter weight.

Other objects and advantages of the invention will be apparent from the following description and the accompanying drawings.

BRIEF DESCRIPTION OF ACCOMPANYING DRAWINGS

FIG. 1 is a schematic diagram of the process in accordance with one embodiment of the invention; and FIG. 2 is a diagram of a feeding system in accordance with an embodiment of the invention.

DETAILED DESCRIPTION OF PREFERRED EMBODIMENT

Referring to FIGS. 1 and 2, a system 10 (FIG. 2) is shown comprising a weaning station 12, feeding station 14, slaughter station 16 and packaging station 18. The stations 12–18 can be, but do not have to be, at the same geographic location. The system 10 and process of the invention will be described relative to a single calf 11, but it should be appreciated that the system and method is suitable for use with other animals, such as ruminant animals, including sheep, goats and cattle. The process of the invention begins at the weaning station 12 (FIG. 2) where a calf 11 is born. After a predetermined time, such as three days in the embodiment being described, the calf 11 is taken from its mother and transferred to a weaning station 12.

At the weaning station 12, the calf 11 is fed a milk replacer, corn, grain and/or a supplement rations 38 from supply 40 until they reach a predetermined weight, such as 300 pounds. The milk replacer, corn grain and/or supplement rations 38 are heated in an oven 43 to above 160 degrees Fahrenheit before they are given to the calf 11, as illustrated in FIG. 1.

After achieving the predetermined weight at the weaning station 12, the calf 11 is transferred to the feeding station 14, such as a feed lot, where it is fed until achieving a slaughter weight, which in the embodiment being described is between 1000 and 1300 pounds. It should be understood that at the feeding station 14, the calf 11 is fed a daily ration 38 of about 20–30 pounds of corn, grain and/or supplement from a supply 40. This provides approximately 3–4 pounds of animal weight. As was done at the weaning station 12, the ration 38 of corn, grain and/or supplement is heated in an oven 43 to above a predetermined temperature, such as 150 or 160 degrees Fahrenheit before the ration 38 is fed to the calf 11 from a trough 42 at the feeding station 14.

After the calf 11 achieves the predetermined slaughter weight, such as 1300 pounds in the embodiment described, the calf 11 is slaughtered in a traditional manner at a slaughtering station 16 (FIG. 2). The slaughtered calf 11 provides a carcass 44, and it should be appreciated that the carcass resulting from each calf 11 processed is substantially the same size and weight because they are substantially the same size at the time of slaughter. This facilitates the carcasses from the animals being the same size so that the meat cuts 46 are substantially the same when the carcass 44 is butchered.

The carcass 44 (FIG. 2) is butchered to provide the meat cuts 46 that are packaged in standardized case-ready packages 48 and then wrapped with cellophane 50. Thereafter, they may be shipped and/or displayed for sale to consumers.

The process is further illustrated are described in FIG. 1, where the process begins at block 20 where the calf 11 is born. After a predetermined number of days (block 22), such as the three days mentioned earlier, the calf 11 is take from its mother and fed the heated rations 38 that are cooked in oven 43 (block 24). After the calf 11 achieves the above-referenced predetermined weight, such as at least 300 pounds (block 26), it is transferred to the feeding station 14.

After the calf 11 achieves the predetermined weight, it is shipped to the feeding station 14 (FIG. 2) for finish feeding (block 28). At the feeding station 14, the feed ration 38 from the feed supply 40 is cooked in the oven 43 to above the predetermined temperature, which as mentioned earlier herein is in excess of 160 degrees Fahrenheit (Block 24 in FIG. 1). The process or method continues to block 30 where the calf 11 is continued to be fed the heated rations 38 (FIG. 2). It should be appreciated that because the rations 38 are heated, the calves 11 find the rations 38 more palatable and consequently tend to eat more per day. This results in improved daily weight gains when compared to systems and methods of the past.

Advantageously, the cooked feed ration 38 facilitates reducing or eliminating bacteria from entering the animal through the feed. Moreover, it has been found that the hot-fed feeding of the feed ration 38 not only sterilizes the food, but also facilitates enabling the calf 11 to improve or increase the digestion process to facilitate growth. In the embodiment being described, the feeding process of the present invention has been found to reduce the normal feeding period by in excess of 30–45 days.

At decision block 32 (FIG. 1), it is determined whether the animal has achieved a predetermined slaughter weight which, as mentioned earlier herein, is on the order of about 1000–1300 pounds. If it has not, the routine loops back to block 30 as shown where the animal is continued to be fed. If it has, however, then the routine proceeds to block 34 where the calf 11 is slaughtered at the slaughter station 16 (FIG. 2) to provide the carcass 44 as mentioned earlier herein. Thereafter, the carcass 44 is butchered to provide the meat cuts 46. The meat cuts 46 are then placed in the case-ready package 48 (Block 36) as illustrated in FIG. 1. After the calf 11 is slaughtered and the meat is cut at block 34 in FIG. 1, the meat cuts 46 are situated in the case-ready package 48. A cellophane covering 50 (FIG. 2) may be applied to the package 48 to seal the meat cuts 46 therein. Thereafter, the sealed packages 48 may be shipped and/or displayed for purchase by a consumer (Block 37).

Thus, it should be appreciated that an advantage of this invention is that it facilitates the use of standard case-ready packages 48 because the system produces carcasses 44 and the meat cuts 46 that are substantially the same size. This, in turn, means that the butchering process can be mechanized to provide meat cuts 46 of substantially the same size from carcass to carcass.

It should be appreciated that the system 10 (FIG. 2) and method of the present invention illustrated in FIG. 1 enables the producer to provide a calf 11 from birth to slaughter weight in approximately 12–14 months, at which time the calf 11 may be slaughtered to provide the carcass 44 and, ultimately, the meat cuts 46 in 12–14 months. By utilizing the case-ready packaging 48, the cuts 46 can quickly be packaged, shipped and/or displayed at a store for examination and purchase by a consumer. Thus, it should be appreciated that the system 10 of the present invention enables a user of the system and process to raise a calf 11 to slaughter weight in approximately 12–14 months on a consistent basis, as opposed to systems of the past which oftentimes required as long as 18–24 months from birth to slaughter.

An advantage of the invention is that is substantially improves the grain-to-meat conversion ratio. In the embodiment being described, the grain-to-meat conversion ratio resulting from use of the present invention is as high as thirty percent better than grain-to-meat conversion ration resulting from feed that is not processed in accordance with the invention. It should be appreciated that the conversion ratio is achieved without using any hormones in the embodiment being described. Thus, the animal is not fed hormones at any time during its life, which improves the quality of the meat cuts 46 (FIG. 2). Thus, a discerning consumer who is looking for a premium, hormone-free meat cut 46 will be provided with a consistent size meat cut 46 and a meat that is the same quality not only from cut to cut but also from animal to animal.

This system 10 and method also provides means for producing consistent quality meat products and enable the animals to be dressed equally which, in turn, provides means to provide the cut meats 46, such as steaks, roasts and shoulders in standard-size case-ready packages 48. In the embodiment described, the case-ready packages 48 can be plastic, paper, Styrofoam or other suitable material.

While the methods herein described, and the forms of apparatus for carrying these methods into effect, constitute preferred embodiments of this invention, it is to be understood that the invention is not limited to these precise methods and forms of apparatus, and that changes may be made in either without departing from the scope of the invention disclosed herein.

What is claimed is:

1. A process for improving meat quality and increasing meat-from-feed conversion for cattle comprising the steps of:

weaning each of said cattle from its mother after a predetermined time, said predetermined time being at least 3 days;

transferring each of said cattle to a weaning station after said predetermined time;

feeding each of said cattle only cooked feed rations that have been heated to a temperature of at least 160 degrees Fahrenheit at said weaning station;

transferring each of said cattle from said weaning station to a feeding station when each of said cattle reaches a predetermined weight;

feeding each of cattle only cooked rations that have been heated to a temperature of at least 160 degrees Fahrenheit at said feeding station; and slaughtering each of said cattle when it achieves a second predetermined weights;

wherein said cooked feed rations fed at said weaning station and said feeding station eliminate bacteria from entering the cattle through the feed.

2. The process as recited in claim 1 wherein said cooked feed rations comprises corn or starch grains or combinations of both.

3. The process as recited in claim 1 wherein said second predetermined weight is at least about 1000 pounds.

4. The process as recited in claim 1 wherein said second predetermined weight is between 1000–1300 pounds.

5. The process as recited in claim 1 wherein said process further comprises the step of:

repeating said process for a plurality of calves.

6. The process as recited in claim 5 wherein said process further comprises the step of:

cutting meat from each of said calves substantially the same size for packaging in case-ready packages.

7. The process as recited in claim 6 wherein said process further comprises the step of:

packaging said cut meat in substantially identical case-ready packages.

8. The process as recited in claim 7 wherein said process further comprises the step of:

displaying said case-ready packages at a store for purchase by a consumer.

* * * * *